United States Patent [19]

Söderberg

[11] Patent Number: 4,915,768

[45] Date of Patent: Apr. 10, 1990

[54] DEVICE FOR APPLYING COVERING MATERIAL

[75] Inventor: Hans Söderberg, Fösabacken, Sweden

[73] Assignee: Sprayway Maskin AB, Sweden

[21] Appl. No.: 311,856

[22] Filed: Feb. 17, 1989

[30] Foreign Application Priority Data

Mar. 4, 1988 [SE] Sweden ............ 8800790

[51] Int. Cl.⁴ ............ B26F 3/02; B32B 35/00

[52] U.S. Cl. ............ 156/527; 156/577; 156/579; 225/38

[58] Field of Search ............ 156/523, 527, 574, 577, 156/579; 225/38, 88; 221/20

[56] References Cited

U.S. PATENT DOCUMENTS

| | | | |
|---|---|---|---|
| 1,739,296 | 12/1929 | du Pont | 156/577 |
| 3,120,461 | 8/1960 | Harbour | 156/554 |
| 3,574,042 | 4/1971 | McMullen et al. | 156/577 |
| 3,730,815 | 5/1973 | Terzian | 156/579 |
| 3,760,998 | 9/1973 | Sakihara | 225/38 |
| 3,950,214 | 11/1974 | Pool et al. | 156/527 |
| 4,130,229 | 12/1978 | Pagnini | 225/42 |
| 4,379,019 | 9/1980 | Pool | 156/527 |
| 4,729,810 | 3/1988 | Brooks | 156/579 |

*Primary Examiner*—Michael Wityshyn

*Attorney, Agent, or Firm*—Burns, Doane, Swecker & Mathis

[57] ABSTRACT

A device for applying covering material provided in the form of a roll, said material having an adhesive layer (31) along one edge section. The device comprises a frame (1) with two parallel holders (3, 4) each for carrying a roll (5, 6) of covering material. A handle (7) connected to the frame extends transversely to said holders and inclined in relation to the plane of the holders. The device simultaneously receives oppositely wound rolls on the holders and permits a web of covering material to be fed from either of the two rolls in opposite directions, as desired. The handle (7) can be swung between two oppositely inclined positions so that the device can be moved in one or the other application direction as desired in order to feed out a web of covering material from the relevant roll of covering material. A web-shearing means (9, 10) is arranged on the frame for respective webs of covering material.

20 Claims, 4 Drawing Sheets

DEVICE FOR APPLYING COVERING MATERIAL

TECHNICAL FIELD

The invention relates to a device for applying covering material, particularly masking material, of the type defined in the preamble of the accompanying main claim.

BACKGROUND ART

When painting, for instance, it is often necessary to protect surfaces adjacent to the surfaces to be painted. A conventional "masking tape" may be used for the purpose, i.e. a relatively ordinary tape with limited adhesive effect, which can be removed after painting. Conventional masking tape sufficies at least for brush paintwork, but if the paint is to be sprayed on, problems arise since for reasons of expense and ease of manipulation, the masking tape cannot be made sufficiently wide to cover an area corresponding to the distance the spray-paint will spread from the edge of the area being painted. Protective paper is therefore often used when spray-painting, masking tape being secured along one edge of the paper while partially overlapping the paper. The tape and the adherent protective paper are then applied on the desired place. However, the technique is tedous, time-consuming and does not always provide satisfactory protection, especially in corners and so on. Furthermore, the paper web tends to weight down the tape, thus tending to tear it off, for what reason the paper must often be secured additionally with pieces of tape. Moreover, the web of paper must often also be cut to fit the surface to be preotected or screened off.

A covering material has been proposed which circumvents or eliminates one or more of the drawbacks mentioned above. This covering material, particularly a masking material is substantially characterised by a strip having a first edge portion provided on one side of the strip with a relatively pressure-sensitive adhesive, and a second edge portion joined to the first edge portion, said second edge portion being gathered transversely to its longitudinal direction and can be spread out. The second edge portion is preferably pleated across its longitudinal direction so that the bands defined by one or more pleats lie substantially parallel and overlapping in the plane of the web. The strip is arranged in the form of a storage roll, the strip being pulled out and secured by the adhesive side of the first edge portion, along the edge portion of the surface to be covered. When the strip has been applied to the extend desired, by means of the adhesive, the other edge portion can be spread out as far as desired. The second edge portion is preferably formed of a foil material having slightly adhesive effect so that the second edge portion adheres to the surface to be covered. The foil may be a thin plastic foil which, by a suitable choice of material or material properties, can easily be arranged so that the electrostatic effect exhibited by such plastic foils produces an adhesive effect against a contact surface. The first edge portion is suitably provided on the other side of the strip with a release agent preventing the adhesive from adhering to the other side of the web in the first edge portion in the roll. The adhesive may alternatively be covered by a tear-off protective foil. The strip of covering material may be formed of a conventional strip of tape and a pleated strip of foil, the tape strip being attached with partial overlap to one edge portion of the foil strip, the gathered section of the foil strip being arranged beside the tape in the plane of the complete strip. The part of the tape strip not covered by the foil strip then constitutes the first edge portion of the strip, and the foil strip constitutes the second edge portion of the complete strip. The pleated section may then be formed on the other side of the complete strip and be arranged beside the tape in the plane of the complete strip. The second edge portion preferably has its free edge section protruding from the gathered section in a direction away from the first edge portion of the complete strip. This enables the edge area of the second edge portion to be easily gripped in order to spread the second edge portion by a simple pulling action.

It will be understood that the covering material described here can easily be used to mask and cover a surface and that the effective width of protection given by the strip can be varied by adjusting the spread of the second edge portion.

The covering material is applied by pulling a suitable length from a storage roll, suitably while at the same time securing the edge portion provided with adhesive to the surface in question. With the object of facilitating application it has been proposed that the storage roll be kept in a cylinder or box provided with a feed-out opening and an adjacent shearing edge, allowing the web of material to be torn off after a suitably length has been pulled out. When pulling out the material, the cylinder is held in one hand while ensuring with the other hand that the adhesive edge portion adheres to the surface. Depending on where and how the protective material is to be applied, it may be necessary to change hands to hold the cylinder or to hold the cylinder in various directions, which may be inconvenient from the working point of view.

OBJECT OF THE INVENTION

The object of the prsent invention is to provide a device enabling simplified and improved application of covering material arranged in the form of a roll.

SUMMARY OF THE INVENTION

The object of the invention is achieved by a device having the features defined in the accompanying claims.

According to the invention, thus, a device is achieved for applying covering material provided in the form of a roll, particularly masking material and especially material having an adhesive layer along one edge section, said device being characterised in that it comprises a frame, two holders arranged on the frame, each for carrying a roll of covering material, the axes of the two holers lying at least substantially parallel, and a handle connected to the frame and extending transversely to said axes, preferably perpendicularly thereto, the device being arranged to simultaneously receive the rolls on the holders and to permit a web of covering material to be fed from the rolls, respectively, in opposite directions, the handle being so arranged that the device can be moved in one or the other of two opposite application directions as desired in order to simultaneously feed out a web of covering material from the relevant roll of covering material, and in that web-shearing means are arranged on the frame at the paths of movement, respectively, of the covering material being fed out.

The device is particularly arranged to receive two rolls being wound on in opposite directions, with their adhesive edge portions facing the same direction.

The extension of the handle preferably forms an acute angle with the plane in which said axes lie, the handle being adjustably secured in the frame, allowing it to be inclined in the opposite direction in relation to said plane, when needed, particularly in conjunction with changing the direction of out-feed. In a preferred embodiment the handle is rotatably secured in the frame so that it can be rotated 180° in order to change the direction of incline.

The frame preferably comprises a frame plate from which the holders protrude at right angles, and frame elements protruding from the frame in the same direction as the holders, for mounting of the handle and the web-shearing means. In this case it is advisable for the handle to be fitted extending in a plane at least substantially parallel to the frame plate and spaced laterally therefrom so that a hand gripping the handle does not come into contact with any construction part along which the frame plate is moved during application of the covering material.

It will thus be understood that the direction of the handle is preferably such that it forms substantially an extension tension of the direction of the arm with which an operator holds the device and also corresponds to the actual direction of feed-out.

It will also be apppreciated that the construction of the device is radially symmetrical, with the handle secured in the plane of symmetry.

The device according to the invention is particularly simple, efficient and flexible to work with. It functions equally well for right-handed and left-handed people. It permits all-round masking, e.g. around the outer edge of a window, using only two directions of movement, e.g. from the top down and from right to left. When moving from top edge to bottom edge or from left side to right side, it is only necessary to alter the setting of the handle and turn the devise "up-side-down", i.e. make sure that the frame plate changes position from one side of the device to the other side. The frame plate is of course the part of the device which in use will be moved close to the edge or the like where the adhesive edge portion of the covering material fedout is to adhere. It is naturally assumed that the rolls of covering material are fitted on their holders with the edge portions provided with adhesive facing the frame plate from which the holders protrude.

Another advantage of the device according to the invention is that it easily permits internal masking from edge to edge, e.g. the inside of a window. In this case masking is started from each edge with overlap in the middle. When masking in one direction, the handle is in one position whereas when masking in the opposite direction, the handle is in its other position, the device having been "inverted".

The invention will be futher described in the following by means of an example with reference to the accompanying drawings.

DESCRIPTION OF EMBODIMENT

Figure 1:
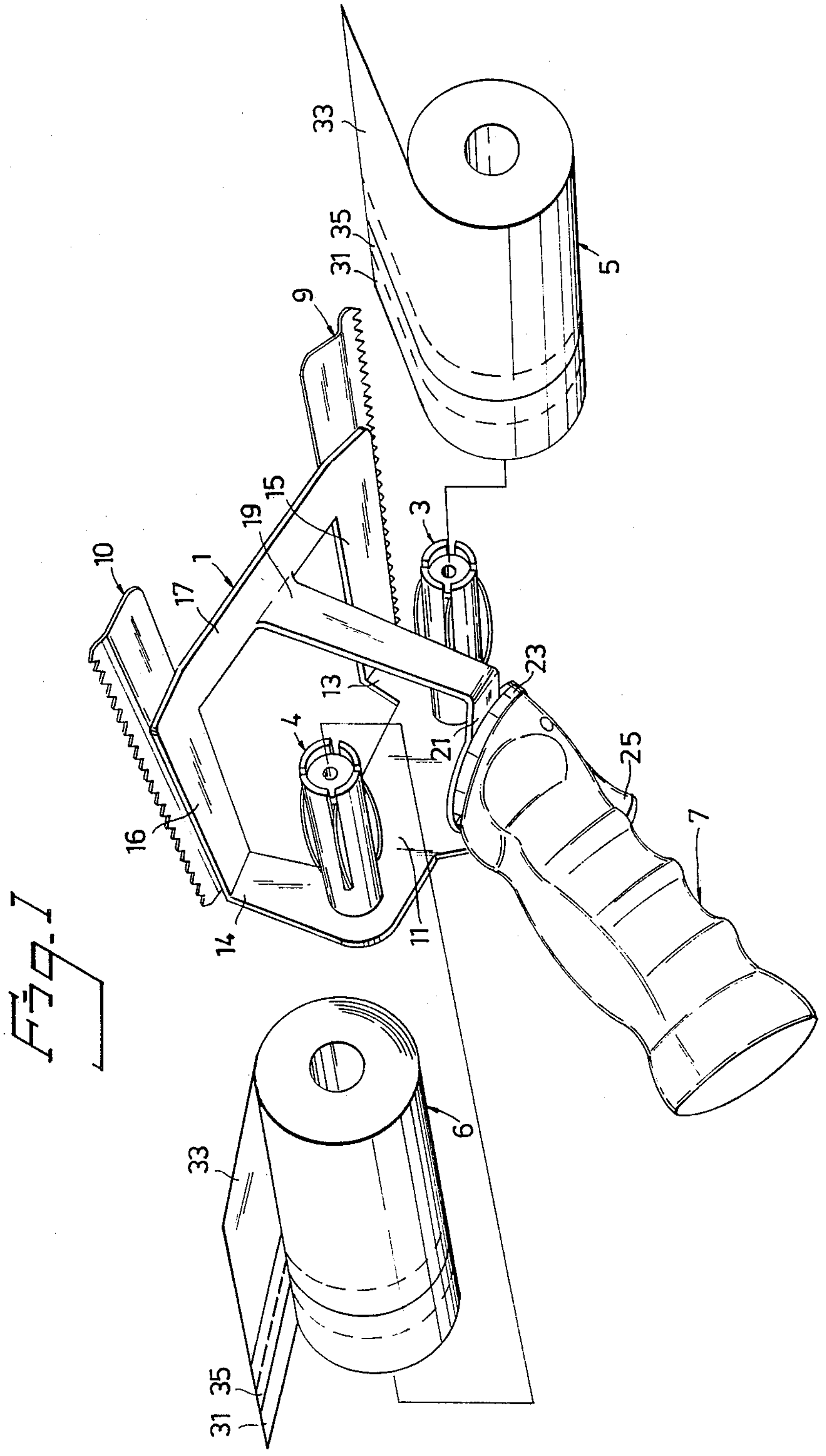
FIG. 1 is a schematic perspective view of a device according to the invention, two belonging rolls of covering material being shown removed from the device in order to clarify the situation.
Figure 3:
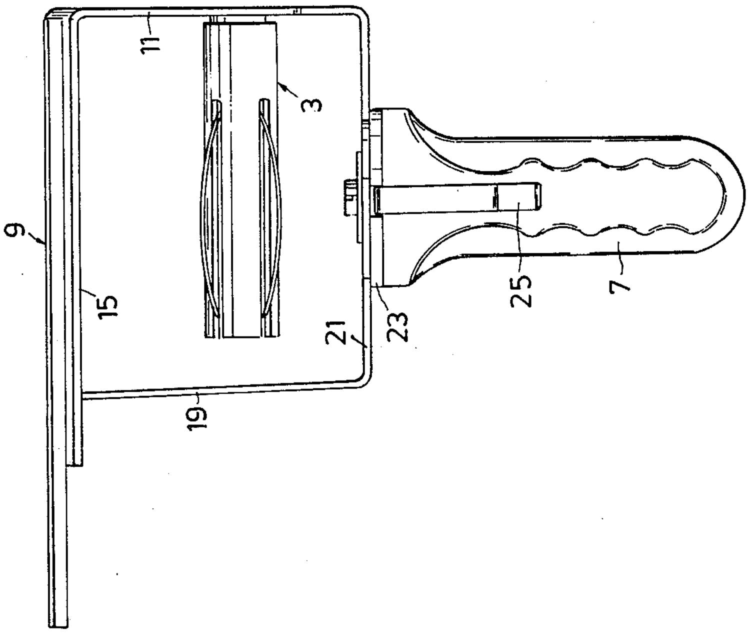
FIG. 3 is a lateral view of the device according to FIGS. 1 and 2.
Figure 2:
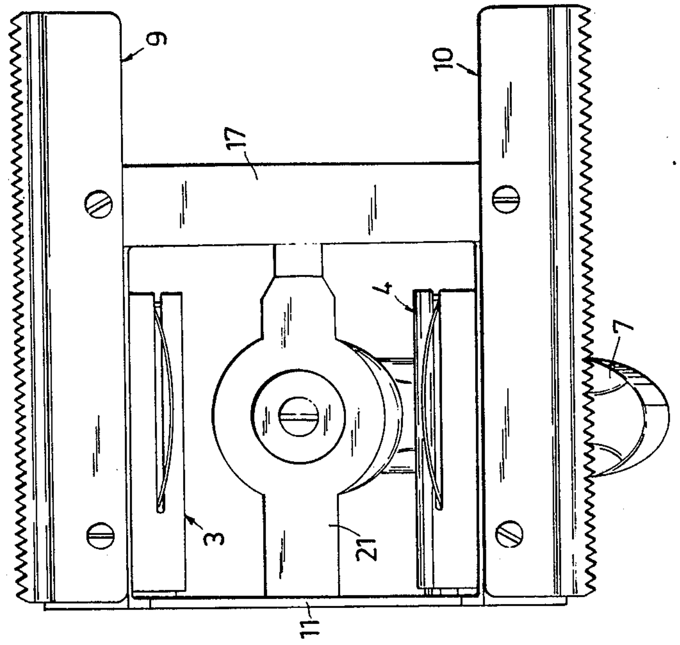
FIG. 2 is a plan view of the device according to FIG. 1 seen from the side opposite to where the handle is located.

The principle components of the device according to the invention illustrated in FIGS. 1–4 of the drawings comprise a frame 1, two holers 3, 4 for rolls 5, 6 of covering material, a handle 7 and two materialshearing bars 9, 10 in conjunction with the two rolls.

The frame 1 includes a frame plate 11, from the upper (in relation to the position shown in FIG. 1) two outer parts 13, 14 of which assembly bars 15 and 16 protrude parallel to each other and in the same plane, perpendicular to the plane of the plate 11. The ends of the bars 15, 16 are joined by a transverse bar 17 lying in the same plane as the bars 15, 16. A support bar 19 protrudes centrally from the bar 17, parallel to the plate 11. The other end of the support bar is joined to a bar 21 to which the handle is secured, the other end of the bar 21 being secured centrally to the lower edge of the plate 11. The plane of the bar 21 lies parallel to that of the bars 15, 16 and thus also perpendicular to the plane of the plate 11. The bar 21 is provided centrally with a circular, wider section onto which the handle 1 is fitted. The entire frame 1 is in the form of an integrated element.

The shearing bars 9, 10 are detachably secured to the bars 15, 16, with their serrated edges parallel to the bars 15, 16 and facing out, i.e. in opposite directions. The bars 9, 10 are exchangeable to allow adjustment of their length to the width of the rolls 5,6.

Figure 4:
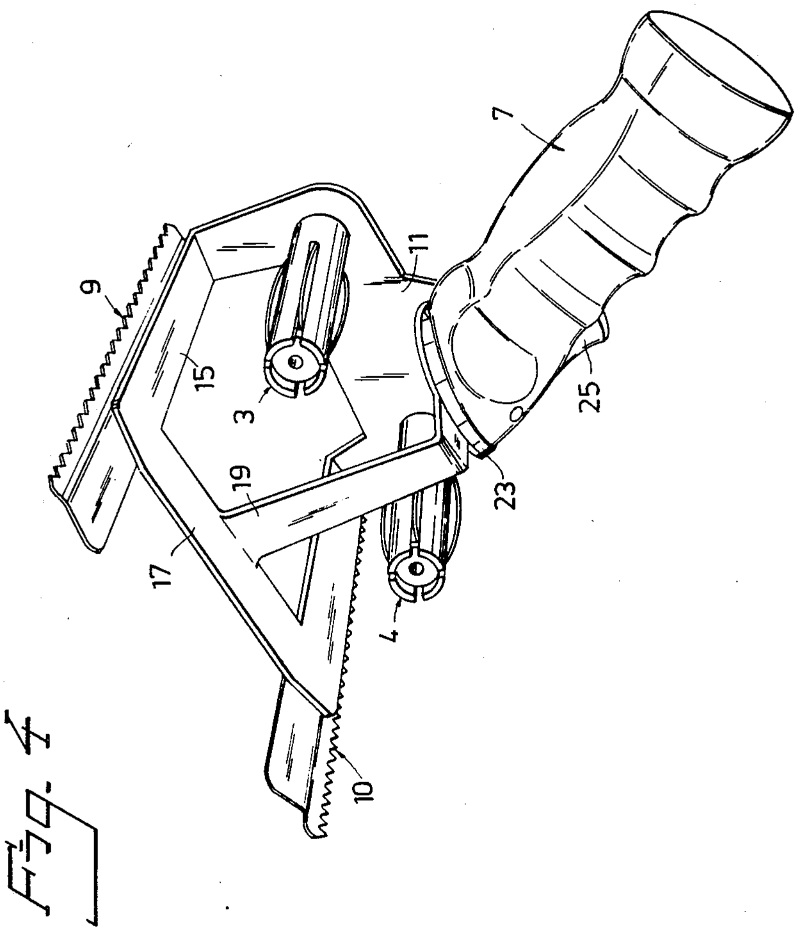
FIG. 4 is a schematic side view of the device according to FIG. 1 when the position of the handle has been changed and the device inverted for use of the other roll of covering material and changing the side on which the covering material shall be adhered.

The handle 7 is assembled with its longitudinal direction at right angles to the axes of the holders and parallel to the frame plate 11. The handle 7 is cut obliquely at the end at which it is joined to the frame, and provided there with a journaling plate 23 rotatably connected centrally on the bar 21. A suitable blocking mechanism (not shown) can be released by a keybar 25 so that the handleplate 23 and thus the handle can be rotated 180° when necessary. Such rotation means that the inclined position of the handle in relation to a plane through the holders 3, 4 and in the plane parallel to the frame plate 11 can be altered, such that the handle will be inclined in the opposite direction, as shown in FIG. 4.

The holders 3, 4 are rotatably journaled so that a web of covering material can be pulled with a certain amount of resistance from a roll applied on its holder. As can be seen, the rolls 5, 6 are oppositely wound so that a covering material web can be pulled from each roll substantially parallel to and past the belonging shearing bar.

The wound covering material consists of an edge tape strip 31 and a protective foil 33 adhered thereto. The edge portion 35 of the foil adheres to a part of the lower side of the tape strip 31 coated with adhesive. The rest of the foil is folded together. When a piece of the web of protective material has been pulled out and torn off, it can be unfolded so that the foil will have a covering width considerably larger than the width of the roll. The tape strip 31 is suitably provided with a release agent on its upper side.

The end of the rolls 5, 6 provided with the tape strip is intended to lie close to the frame plate so that when supplying a web of covering material (the frame plate then being moved along close to the edge where masking is to start), the tape strip will be close to the edge and will adhere to said edge.

FIG. 1 shows the device according to the invention in position for masking close to an edge (not shown) on the lefthand side. The protective material is then fed from roll 5 on holder 3, past shearing bar 9. After the web of material has been initially secured to the surface to be protected, feeding out is achieved by the device, held by the handle 7, being moved along the edge in question. When a suitable length of the web has been pulled out, the web is torn off against the serrated edge of the bar 9.

If a parallel edge (not shown) to the right of the figure is to be masked, the direction of the handle 7 is first changed by releasing the rotation catch and then rotating the handle 7 180° about its attachment on the bar 21. The device is then turned completely around, i.e. reversed in relation to how it is shown in FIG. 1. It will then have the appearance shown in FIG. 4. The protective material can now be fed out in the same way as previously (from top to bottom), although the material will be fed out from the other roll 6 on the holder 4.

Since the device is radially symmetrical its function and manipulation will be independent of whether it is held in the right or the left hand. This symmetrical construction, combined with the double, oppositely applied rolls and adjustable handle also means, as one skilled in the art will readily understand, that the device can be used for masking practically anywhere while still retaining ergonometrically correct manipulation.

Figure 6:
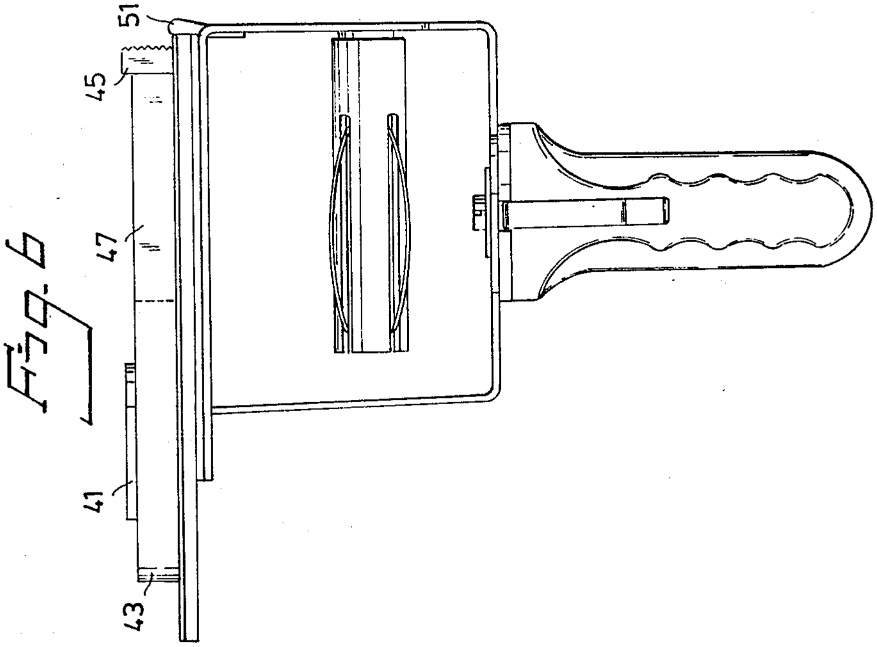
FIG. 5 and 6 are views corresponding to those shown in FIGS. 2 and 3, but showing the device provided with an extra roll of tape.
Figure 5:
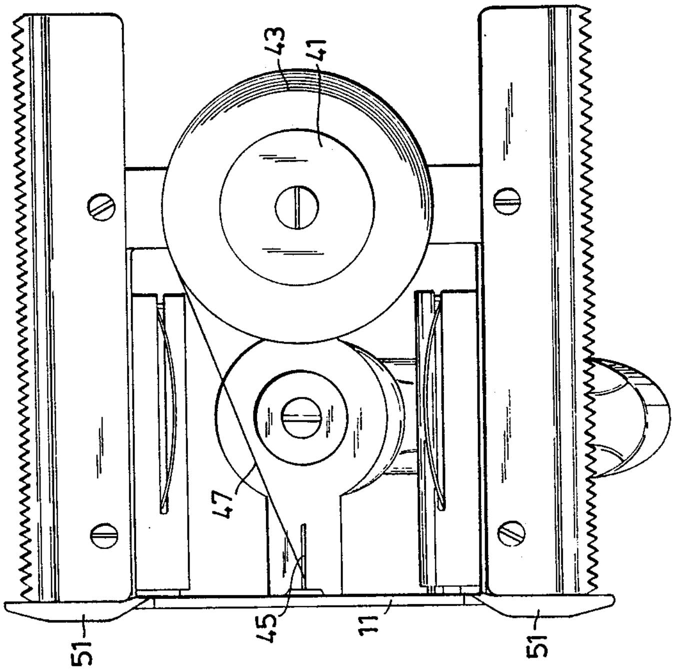

FIGS. 5 and 6 show a device according to FIGS. 1–4 additionally provided with means for an extra roll of tape. A holder 41 for a tape roll 43 is arranged on the outside of the bar 17. A tape cutter 45 has also been provided on the frame plate 11. The tape 47 pulled from the roll 43 is secured to the cutter 45 ready for use. The extra tape can be used, for instance, to secure protective foil which is stretched out in upward direction, in order to seure it additionally against wind, etc.

The device according to FIGS. 5 and 6 has also been provided with an extra edge protector 51 at the inner edge of the shearing bars 9 and 10, respectively, which might scrape against easily damaged surfaces when protective material is being pulled out or torn off.

I claim:

1. A device for applying covering material provided in the form of a roll, comprising:

a frame, two holders arranged on the frame, each holder for carrying a roll of covering material, the axes of the two holders lying substantially parallel to each other, a handle connected to the frame and extending between said axes and in a plane substantially perpendicular thereto, the device being arranged to simultaneously receive a roll of covering material on each holder and to permit a web of covering material to be fed from the two rolls, respectively, in opposite directions, the handle being so arranged that the device can be moved in one application direction in order to simultaneously feed out a web of covering material and in an opposite application direction in order to simultaneously feed out a web of covering material from the other of the rolls of covering material, and a webshearing means arranged on the frame in each of the application directions of the covering material being fed out.

2. A device as claimed in claim 1, wherein the device is arranged to receive two rolls being wound in opposite directions.

3. A device as claimed in claim 1, wherein the handle forms an acute angle with the plane in which said axes lie, the handle being adjustably secured to the frame, allowing the handle to be inclined in the opposite direction in relation to said plane in conjunction with changing the direction of out-feed.

4. A device as claimed in claim 3, wherein the handle is rotatably secured in the frame and can be rotated 180° in order to change the direction of incline.

5. A device as claimed in claim 1, that is symmetrical about a plane midway between the webshearing means which is also perpendicular to the plane which includes both roller axes.

6. A device as claimed in claim 1, wherein the frame comprises a frame plate from which the holders protrude at right angles, and several frame elements which protrude from the frame in the same direction as the holders for mounting the handle and the webshearing means.

7. A device as claimed in claim 6, wherein the handle is mounted extending in a plane substantially parallel to the frame plate and space laterally therefrom so that a hand gripping the handle does not come into contact with any construction part along which the frame plate is moved during application of the covering material.

8. A device as claimed in claim 6, wherein said several frame elements for mounting the handle and the webshearing means, respectively, are arranged on opposite sides of the holders.

9. A device as claimed in claim 2, wherein the handle forms an acute angle with the plane in which said axes lie, the handle being adjustably secured in the frame, allowing the handle to be inclined in the opposite direction in relation to said plane in conjunction with changing the direction of out-feed.

10. A device as claimed in claim 2, that is symmetrical about a plane midway between the webshearing means which is also perpendicular to the plane which includes both roller axes.

11. A device as claimed in claim 3, that is symmetrical about a plane midway between the webshearing means which is also perpendicular to the plane which includes both roller axes.

12. A device as claimed in claim 4, that is symmnetrical about a plane midway between the webshearing means which is also perpendicular to the plane which includes both roller axes

13. A device as claimed in claim 2, wherein the frame comprises a frame plate from which the holders protrude at right angles, and frame elements protruding from the frame in the same direction as the holders, for mounting of the handle and web-shearing means.

14. A device as claimed in claim 3, wherein the frame comprises a frame plate from which the holders protrude at right angles, and frame elements protruding from the frame in the same direction as the holders, for mounting of the handle and web-shearing means.

15. A device as claimed in claim 4, wherein the frame comprises a frame plate from which the holders protrude at right angles, and frame elements protruding from the frame in the same direction as the holders, for mounting of the handle and web-shearing means.

16. A device as claimed in claim 5, wherein the frame comprises a frame plate from which the holders protrude at right angles, and frame elements protruding from the frame in the same direction as the holders, for mounting of the handle and web-shearing means.

17. A device as claimed in claim 10, wherein the frame comprises a frame plate from which the holders protrude at right angles, and frame elements protruding from the frame in the same direction as the holders, for mounting of the handle and web-shearing means.

18. A device as claimed in claim 11, wherein the frame comprises a frame plate from which the holders protrude at right angles, and frame elements protruding from the frame in the same direction as the holders, for mounting of the handle and web-shearing means.

19. A device as claimed in claim 12, wherein the frame comprises a frame plate from which the holders protrude at right angles, and frame elements protruding from the frame in the same direction as the holders, for mounting of the handle and web-shearing means.

20. A device as claimed in claim 7, characterized in that said several frame elements for mounting the handle and the webshearing means, respectively, are arranged on opposite sides of the holders.

* * * * *